This invention relates to a method for establishing the anterior-posterior position of a mandibular dental arch. More specifically, it relates to locating the position of the second molar in such an arch in relation to the anterior contracting border of the masseter muscle.

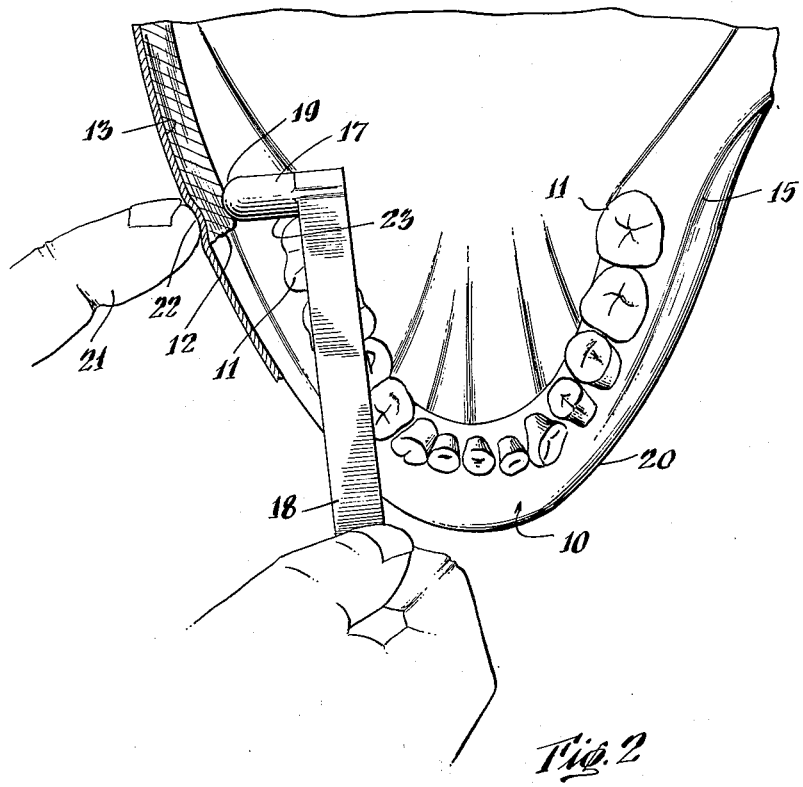
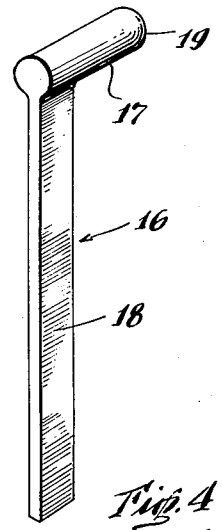
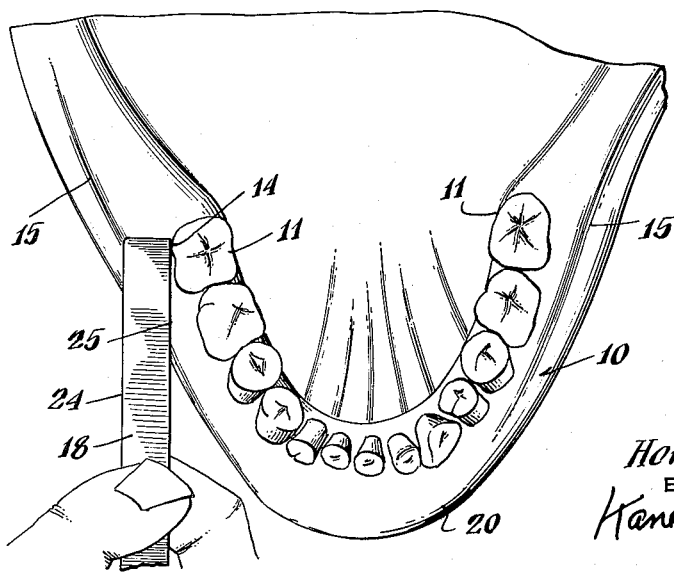
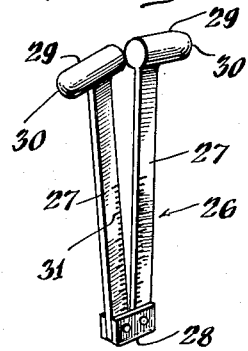
INVENTOR
Homer C. Vaughan
BY
Kane, Dalsimer & Kane
ATTORNEYS 3,002,277
METHOD OF ESTABLISHING THE RELATIONSHIP OF COMPONENTS OF AN ARTIFICIAL DENTAL ARCH OR A NATURAL DENTAL ARCH AND TOOL FOR USE IN SUCH METHOD
Homer Cree Vaughan, 430 Dogwood Lane, Manhasset, N.Y.
Filed Apr. 16, 1956, Ser. No. 578,511
9 Claims. (Cl. 32—40)

The normal natural, endentulous or partially endentulous jaw is asymmetrical, thus making it extremely difficult to construct dentures and correctly position them. This invention measures this asymmetry and correlates it in a denture, bridge, or orthodontic appliance.

Prior to this invention, it was extremely difficult to accurately position the second molar in a denture. In actual practice, the tooth was, and still is, moved around until the bite became correct. This was a clumsy operation and not accurate.

I have established that the correct position of a second molar is related to the anterior contracting border of the masseter muscle. I have additionally discovered that the distance between the buccal surface of the second molar and the external oblique ridge of the mandible is between 5 and 7 mm. Since this tooth may be located relative to means separate from the jaw bone, it becomes a perfect base tooth for use in designing a dental arch.

It is, therefore, an object of this invention to provide a method for conveniently and correctly locating the second molar in relation to the anterior contracting border of the masseter muscle.

It is a further object of this invention to provide a method for positioning the second molar a proper distance from the external oblique ridge of the mandible.

It is a still further object of this invention to disclose any position particularly aberrant of the mandibular dental arch.

It is also an object of this invention to provide a gauge to facilitate the practice of the above positioning methods.

With these and other objects in mind, reference is had to the attached sheet of drawings illustrating one form of the invention and in which:

FIG. 1 shows the positioning of a second molar, in relation to the anterior contracting border of the masseter muscle, by the use of a blunt-headed gauge;

FIG. 2 illustrates the positioning of the second molar, in relation to the external oblique ridge of the mandible, by the use of a width gauge;

FIG. 3 is a perspective view of one form of positioning gauge; and

FIG. 4 is a perspective view of an alternative form of positioning gauge.

In considering a method of locating the anterior-posterior position of a mandibular dental arch, the numeral 10 indicates the lower jaw of a human mouth.

Due to the asymmetrical shape of the average jaw, it is desirable, when constructing a mandibular dental arch to locate base points from which to work. The second molar 11—due to the fact that it may be located by means external of the jaw—is a good base point. I have established that for the proper functioning of the jaw, the second molar must be aligned relative ot the anterior contracting border 12 of the masseter muscle 13. It is also a fact that the buccal surface 14 of the second molar 11 must be spaced between 5 and 7 mm. from the external oblique ridge of the mandible 15. Research has shown that 6 mm. is average, with 90% of the cases studied varying between 5 mm. and an extreme 7 mm.

In the preparation of a mandibular dental arch, the second molar may be located with the aid of a muscle arch indicator gauge 16 (FIG. 3). The gauge, as shown, comprises a blunt-headed finger 17 and an elongated flat handle shank 18 of a desired width (usually 5 mm.), rigidly connected to the end of the finger 17 on the end directed away from the blunt head 19, and perpendicular to the axis of the finger 17. The muscle arch indicator may be constructed of a durable material, such as metal, or it may be made of an inexpensive disposable material, such as wood or plastic.

When constructing the mandibular dental arch, a mold 20 is made of the mandibular arch and inserted in the mouth in covering relation with respect to the lower jaw. The anterior contracting border 12 of the masseter muscle 13 is located by the operator's finger 21 and pressure is applied by the finger at that point. The blunt-headed finger 17 of the muscle arch indicator gauge 16 is placed in the mouth with the blunt head 19 of the finger 17 adjacent the tip 22 of the finger 21. A second molar 11 is then mounted on the mold 20 abutting finger 17 at edge 23. In this manner, the distal surface of the second molar is aligned with the anterior contracting border of the masseter muscle.

In order to properly space the second molar 11 from the external oblique ridge of the mandible 15, the elongated handle gauge 18 of the muscle arch indicator 16 is placed in the mouth with an edge 24 adjacent and generally parallel the external oblique ridge of the mandible 15. The second molar 11 is then shifted laterally until the buccal surface 14 abuts the edge 25 of the handle gauge 18. In this manner, the second molar is properly spaced from the external oblique ridge of the mandible.

When the second molar has been located with respect to the external oblique ridge of the mandible and aligned with the anterior contracting border of the masseter muscle, it may be secured against movement in the mold 20.

The above method should be repeated on the opposite end of the mandibular arch and another second molar secured in place. Once this has been done, two base points exist on which to build the remainder of the arch.

In a case where the above operation is performed to relocate natural teeth, the teeth may be protected by covering finger 17 with a resilient collar of rubber or other soft material.

FIG. 4 of the drawing illustrates an alternative form of the muscle arch indicator gauge 16. The double action muscle arch indicator gauge 26 comprises two elongated flat handle shanks 27 movably hinged at pivot bar 28 for free movement with relation to the bar in such manner that in their closed position, shanks 27 will be adjacent and parallel each other. Each shank 27 has a blunt-headed finger 29 rigidly connected perpendicular to its length at the end opposite the hinge 28. In the closed position of shanks 27, the fingers 29 abut each other at their ends opposite blunt heads 30. A scale 31, preferably in millimeters, is cut in shanks 27. This double-action muscle arch indicator gauge facilitates the construction of the mandibular dental arch, in that the second molars, on either end of the dental arch may be aligned with the anterior contracting borders of their respective masseter muscles in the same operation. Furthermore, if the jaw is asymmetrical, the double action indicator gauge will adjust itself to the true shape of the jaw, because each blade 27 is freely movable in relation to pivot bar 28.

The gauge 26 is operated much the same as the muscle arch indicator 16 when aligning the second molar with the anterior contracting border of the masseter muscle. The anterior contracting border of the muscle is located with the tip of the operator's finger placed outwardly of the cheek and the gauge 26 is inserted in the mouth in such a position that blunt head end 30 lies adjacent the tip of the operator's finger pressing against the outer surface of the cheek. Without moving or withdrawing gauge 26 from the mouth, the blades 27 are separated from their closed position and the other blunt-headed finger 29 is aligned with the anterior contracting border of the masseter muscle on the opposite end of the mandibular arch. When both gauges are in place, the molars are positioned as above described.

The scale 31 shown in FIG. 4 may be utilized to facilitate the correct location of a second molar in a denture. The scale has not been shown in FIG. 3. However, it may be incorporated in that instrument.

When using scale 31, the instrument of either FIG. 3 or 4 is located with respect to the anterior contracting border of the masseter muscle as above described. If the instrument of FIG. 3 is to be used a measurement is then taken from the distal surface of the second molar to the distal border of the lower cuspid, utilizing scale 31. If the instrument of FIG. 4 is to be used a measurement is taken from the distal surface of each second molar to the distal surface of the lower incisor teeth. The measurements may then be transferred to a denture by placing the appropriate portion of scale 31 adjacent the distal surface of the lower cuspid or incisor, depending on which instrument was used, and moving the second molar such that it abuts finger 17 or 29.

Thus, among others, the several objects of the invention as aforenoted are achieved. Obviously, numerous changes in method and reconstruction of the gauge may be resorted to without departing from the spirit of the invention as defined by the claims.

I claim:

1. For use in accurately locating the correct positioning of a mandibular second molar for establishing the anterior-posterior position of a mandibular arch, the muscle arch indicator comprising an elongated and substantially flat handle shank having a measuring scale thereon, said shank having opposed sides and edges, the shank width being substantially larger than the shank thickness, a substantially enlarged blunt-headed finger rigidly connected thereto and extending transversely therefrom in a direction substantially normal to a plane disposed approximately normal to said sides, the blunt head of said finger being adapted to engage the anterior contracting border surfaces of the masseter muscle, and said finger presenting other surfaces projecting beyond surfaces of said handle shank for engaging a mandibular second molar while the blunt head of said finger engages said surfaces of said masseter muscle.

2. The invention in accordance with claim 1, wherein said elongated handle shank is substantially 5 millimeters wide.

3. The invention in accordance with claim 1, wherein said first-defined muscle arch indicator is associated with a second substantially identical muscle arch indicator, and means for movably associating the shanks of each of the indicators in such a manner that in normal position the fingers of each of said indicators are adjacent one another and are movable to an offset position with respect to one another.

4. A method of securing an artificial second molar in correct position on a mold of a jaw from which an artificial denture is to be made comprising: providing a mold of the mandibular arch, inserting said mold in covering relation to the lower jaw, locating the anterior contracting border of the masseter muscle, aligning the distal surface of the second molar with said anterior contracting border, positioning said second molar so that the buccal surface of said molar lies between 5 and 7 mm. from the external oblique ridge of the mandible, and securing said molar in said mold.

5. A method of securing an artificial second molar in correct position on a mold of a jaw from which an artificial denture is to be made comprising: providing a mold of the mandibular arch, inserting said mold in covering position with respect to the lower jaw, locating the anterior contracting border of the masseter muscle with a blunt-headed gauge, aligning the distal surface of a second molar with said anterior border of the masseter muscle by inserting said molar in abutting relation to said gauge, spacing the second molar from the external oblique ridge of the mandible by placing a width gauge of a prescribed width corresponding approximately to the prescribed normal spacing between the buccal surface of a second molar and the external oblique ridge of the adjacent mandible between the buccal surface of the second molar and the external oblique ridge in such a manner that the gauge will substantially span the space between said second molar and said external oblique ridge and securing said molar against movement on said mold.

6. In a method as in claim 5, wherein the anterior contracting border of the masseter muscle is located with a finger pressed outwardly of the cheek and said blunt-headed gauge is aligned inwardly of the cheek with said finger.

7. A method of securing an artificial second molar in correct position on a mold of a jaw from which an artificial denture is to be made comprising: providing a mold of the mandibular arch, inserting said mold in covering position with respect to the lower jaw, locating the anterior contracting borders of the masseter muscles on both ends of the mandibular arch with associated blunt-headed gauges, aligning the distal surface of a second molar relative to the anterior contracting border of the masseter muscle at each end of the mandibular arch by mounting said molars on the arch adjacent said gauges, spacing said molars from the external oblique ridge of the mandible on each side of the mandibular arch by placing a width gauge of a prescribed width corresponding approximately to the prescribed normal spacing between the buccal surface of a second molar and the external oblique ridge of the adjacent mandible between the buccal surfaces of the second molars and the external oblique ridge in such a manner that the gauge will substantially span the space between said molars and said external oblique ridge and securing said molars against movement on said mold.

8. A method of securing an artificial second molar in correct position on a mold of a jaw from which an artificial denture is to be made comprising: providing a mold of the contour of a mandibular dental arch, inserting said mold in covering position with respect to the lower jaw, locating a point on said mandibular dental arch adjacent the anterior contracting border of the masseter muscle, measuring the distance between said point and the distal border of the lower cuspid, positioning a second molar in said mold such that the distal surface of said molar is said distance from the distal border of the lower cuspid, and securing said molar on said mold.

9. A method of securing an artificial second molar in correct position on a mold of a jaw from which an artificial denture is to be made comprising: providing a mold of the contour of a mandibular dental arch, inserting said mold in covering relation to the lower jaw, locating a point on each end of said mandibular dental arch adjacent the anterior contracting border of a masseter muscle, measuring the distance between said points and the distal border of the lower incisor teeth, positioning second molars in said mold such that the distal surfaces of said molars are said distance from the distal border of the lower incisor teeth, and securing said molars against movement on said mold.

References Cited in the file of this patent

UNITED STATES PATENTS

| | | |
|---|---|---|
| 1,685,109 | Weber | Sept. 25, 1928 |
| 2,055,274 | Avery | Sept. 22, 1936 |
| 2,237,378 | Thienemann | Apr. 8, 1941 |